United States Patent
Hess

(10) Patent No.: US 8,001,137 B1
(45) Date of Patent: Aug. 16, 2011

(54) METHOD OF IDENTIFYING CONNECTED DATA IN RELATIONAL DATABASE

(75) Inventor: Brian M. Hess, Bolton, MA (US)

(73) Assignee: The United States of America as represented by the Director of the National Security Agency, Washington, DC (US)

( * ) Notice: Subject to any disclaimer, the term of this patent is extended or adjusted under 35 U.S.C. 154(b) by 110 days.

(21) Appl. No.: 12/589,899

(22) Filed: Oct. 15, 2009

(51) Int. Cl.
*G06F 17/30* (2006.01)

(52) U.S. Cl. ........................................ 707/758; 707/736

(58) Field of Classification Search ................... 707/758, 707/736
See application file for complete search history.

(56) References Cited

U.S. PATENT DOCUMENTS

| | | | |
|---|---|---|---|
| 5,701,467 A | 12/1997 | Freeston | |
| 6,792,414 B2 | 9/2004 | Chaudhuri et al. | |
| 7,519,613 B2 | 4/2009 | Guha et al. | |
| 7,640,229 B1 * | 12/2009 | Kaufmann et al. | 1/1 |
| 2005/0060287 A1 | 3/2005 | Hellman et al. | |
| 2008/0059439 A1 | 3/2008 | Fan et al. | |
| 2008/0114801 A1 * | 5/2008 | Singh | 707/102 |
| 2009/0043797 A1 | 2/2009 | Dorie et al. | |

\* cited by examiner

*Primary Examiner* — Hosain Alam
*Assistant Examiner* — Johnese Johnson
(74) *Attorney, Agent, or Firm* — Robert D. Morelli

(57) ABSTRACT

A method of identifying connected data in relational database by receiving relational database, receiving data components from relational database, initializing a first table and a second table with data identifiers and connection information, initializing a third table with data identifiers, initializing a transition table; replacing each entry in the third table with a user-definable relationship of its corresponding identifier in the second table, its corresponding connected data component identifier in the second table, and the identifier to which an equivalent identifier transitioned in the transition table; updating the transition table, updating the second table, returning to the replacement step if the third table changed, and, otherwise, identifying the received data components as connected that correspond to entries in the third table that are equal.

8 Claims, 7 Drawing Sheets

| | | | | | | | | |
|---|---|---|---|---|---|---|---|---|
| TABLE 1 | 1:3 | 2:5,6 | 3:1,4 | 4:3,5 | 5:2,4 | 6:2 | 7:8 | 8:7 |
| TABLE 2 | 1:3 | 2:5,6 | 3:1,4 | 4:3,5 | 5:2,4 | 6:2 | 7:8 | 8:7 |
| TABLE 3 | 1 | 2 | 3 | 4 | 5 | 6 | 7 | 8 |
| TRANSITION TABLE | | | | | | | | |

| | | | | | | | | |
|---|---|---|---|---|---|---|---|---|
| TABLE 1 | 1:3 | 2:5,6 | 3:1,4 | 4:3,5 | 5:2,4 | 6:2 | 7:8 | 8:7 |
| TABLE 2 | 1:1 | 2:2,2 | 1:1,3 | 3:1,2 | 2:2,3 | 2:2 | 7:7 | 7:7 |
| TABLE 3 | 1 | 2 | 1 | 3 | 2 | 2 | 7 | 7 |
| TRANSITION TABLE | | | 3-1 | 4-3 | 5-2 | 6-2 | | 8-7 |

| | | | | | | | | |
|---|---|---|---|---|---|---|---|---|
| TABLE 1 | 1:3 | 2:5,6 | 3:1,4 | 4:3,5 | 5:2,4 | 6:2 | 7:8 | 8:7 |
| TABLE 2 | 1:1 | 2:1,2 | 1:1,1 | 1:1,1 | 1:1,2 | 2:2 | 7:7 | 7:7 |
| TABLE 3 | 1 | 2 | 1 | 1 | 1 | 2 | 7 | 7 |
| TRANSITION TABLE | | | | | 2-1 | | | |

| TABLE 1 | 1:3 | 2:5,6 | 3:1,4 | 4:3,5 | 5:2,4 | 6:2 | 7:8 | 8:7 |
|---|---|---|---|---|---|---|---|---|
| TABLE 2 | 1:1 | 1:1,1 | 1:1,1 | 1:1,1 | 1:1,1 | 1:1 | 7:7 | 7:7 |
| TABLE 3 | 1 | 1 | 1 | 1 | 1 | 1 | 7 | 7 |
| TRANSITION TABLE | | 2-1 | | | | 2-1 | | |

| TABLE 1 | 1:3 | 2:5,6 | 3:1,4 | 4:3,5 | 5:2,4 | 6:2 | 7:8 | 8:7 |
|---|---|---|---|---|---|---|---|---|
| TABLE 2 | 1:1 | 1:1,1 | 1:1,1 | 1:1,1 | 1:1,1 | 1:1 | 7:7 | 7:7 |
| TABLE 3 | 1 | 1 | 1 | 1 | 1 | 1 | 7 | 7 |
| TRANSITION TABLE | | | | | | | | |

METHOD OF IDENTIFYING CONNECTED DATA IN RELATIONAL DATABASE

FIELD OF THE INVENTION

The present invention relates to data processing and, more particularly, to query processing.

BACKGROUND OF THE INVENTION

A relational database is a database that groups data using common attributes. For example, real estate transactions may be stored in a relational database according to the year of the transaction, the sales price, the buyer's name, the seller's name, and so on. A group of data in a relational database is commonly referred to as a table.

A relation in a relational database is a set of tuples that have the same attribute, where a tuple represents an object and information about the object. Tuples and attributes are stored in no particular order.

A relation that contains all of the information that a person is interested in is commonly referred to as a base relation. A relation that can only be derived from information contained in more than one relation is commonly referred to as a derived relation.

One computer language used to query a relational database is Structured Query Language (SQL). SQL is good for querying a relational database and allowing the user to determine a derived relation manually. It would be an improvement if SQL could be used to automatically determine a derived relation. The present invention is a method of querying a relational database using a computer language such as SQL to automatically determine a user-definable derived relation. Such a method is faster and less prone to errors than a manual method of determining a derived relation.

U.S. Pat. No. 5,701,467, entitled "COMPUTER DATA STORAGE MANAGEMENT SYSTEM AND METHODS OF INDEXING A DATASPACE AND SEARCHING A COMPUTER MEMORY," discloses a device for and method of storing additional information when memory is full at a particular hierarchical level by storing the additional information at a higher hierarchical level. U.S. Pat. No. 5,701,467 is hereby incorporated by reference into the present invention.

U.S. Pat. No. 6,792,414, entitled "GENERALIZED KEYWORD MATCHING FOR KEYWORD BASED SEARCHING OVER RELATIONAL DATABASES," discloses a device for and method of improving matching and searching capability by creating look-up tables. U.S. Pat. No. 6,792,414 is hereby incorporated by reference into the present invention.

U.S. Pat. No. 7,519,613, entitled "METHOD AND SYSTEM FOR GENERATING THREADS OF DOCUMENTS," discloses a device for and method of generating threads of documents by generating a relevance graph and using a matching-based algorithm or dynamic programming. U.S. Pat. No. 7,519,613 is hereby incorporated by reference into the present invention.

U.S. Pat. App. Pub. No. 20050060287, entitled "SYSTEM AND METHOD FOR AUTOMATIC CLUSTERING, SUB-CLUSTERING AND CLUSTER HIERARCHIZATION OF SEARCH RESULTS IN CROSS-REFERENCED DATABASES USING ARTICULATION NODES," discloses a method of adding reference entries to data in a database to allow the data to be represented as a mathematical graph or network so that it may be more easily navigated. U.S. Pat. App. Pub. No. 20050060287 is hereby incorporated by reference into the specification of the present invention.

U.S. Pat. App. Pub. No. 20080059439, entitled "QUERY TRANSLATION FROM XPATH TO SQL IN THE PRESENCE OF RECURSIVE DTDS," discloses a device for and method of translating XPATH queries into SQL queries. U.S. Pat. App. Pub. No. 20080059439 is hereby incorporated by reference into the specification of the present invention.

U.S. Pat. App. Pub. No. 20090043797, entitled "SYSTEM AND METHODS FOR CLUSTERING LARGE DATABASE OF DOCUMENTS," discloses a device for and method of creating a finger print for a document that cites another document and assigning the document to a cluster within a database. U.S. Pat. App. Pub. No. 20090043797 is hereby incorporated by reference into the specification of the present invention.

SUMMARY OF THE INVENTION

It is an object of the present invention to identify on a computing device connected data components returned from a relational database.

It is a further object of the present invention to identify on a computing device connected data components returned from a relational database that uses the Structured Query Language (SQL).

The present invention is a method of identifying on a computing device connected data components returned from a relational database.

The first step of the method is receiving a relational database, where the relational database includes a user-definable number of data components, where each data component includes a unique identifier, where each unique identifier indicates an order of the associated data component as compared to the other data components, and where each data component includes information that indicates if it is connected to another data component and, if so, the identifier of each connected data component. (SQL, numbers)

The second step of the method is receiving a user-definable number of data components from the relational database.

The third step of the method is initializing a first table and a second table, where the first table and the second table each include an entry for each identifier of a received data component and the identifiers, if any, of connected data components. (low to high, high to low)

The fourth step of the method is initializing a third table, where the third table includes an entry for each identifier of a received data component in the same manner as in the first table.

The fifth step of the method is initializing a transition table, where the transition table includes entries to indicate transitions, if any, between corresponding identifiers in the second table and the third table.

The sixth step of the method is replacing each entry in the third table with a user-definable relationship of its corresponding identifier in the second table, its corresponding connected data component identifier in the second table, and the identifier to which an equivalent identifier transitioned in the transition table.

The seventh step of the method is updating the transition table in accordance with the results of the sixth step.

The eighth step of the method is updating the second table in accordance with the results of the sixth step.

The ninth step of the method is returning to the sixth step if the third table was changed as a result of the sixth step. Otherwise, proceeding to the next step.

The tenth step of the method is identifying the received data components as connected that correspond to entries in the third table that are equal.

DETAILED DESCRIPTION OF THE INVENTION

The present invention is a method of identifying on a computing device connected data returned from a relational database.

Figure 1:
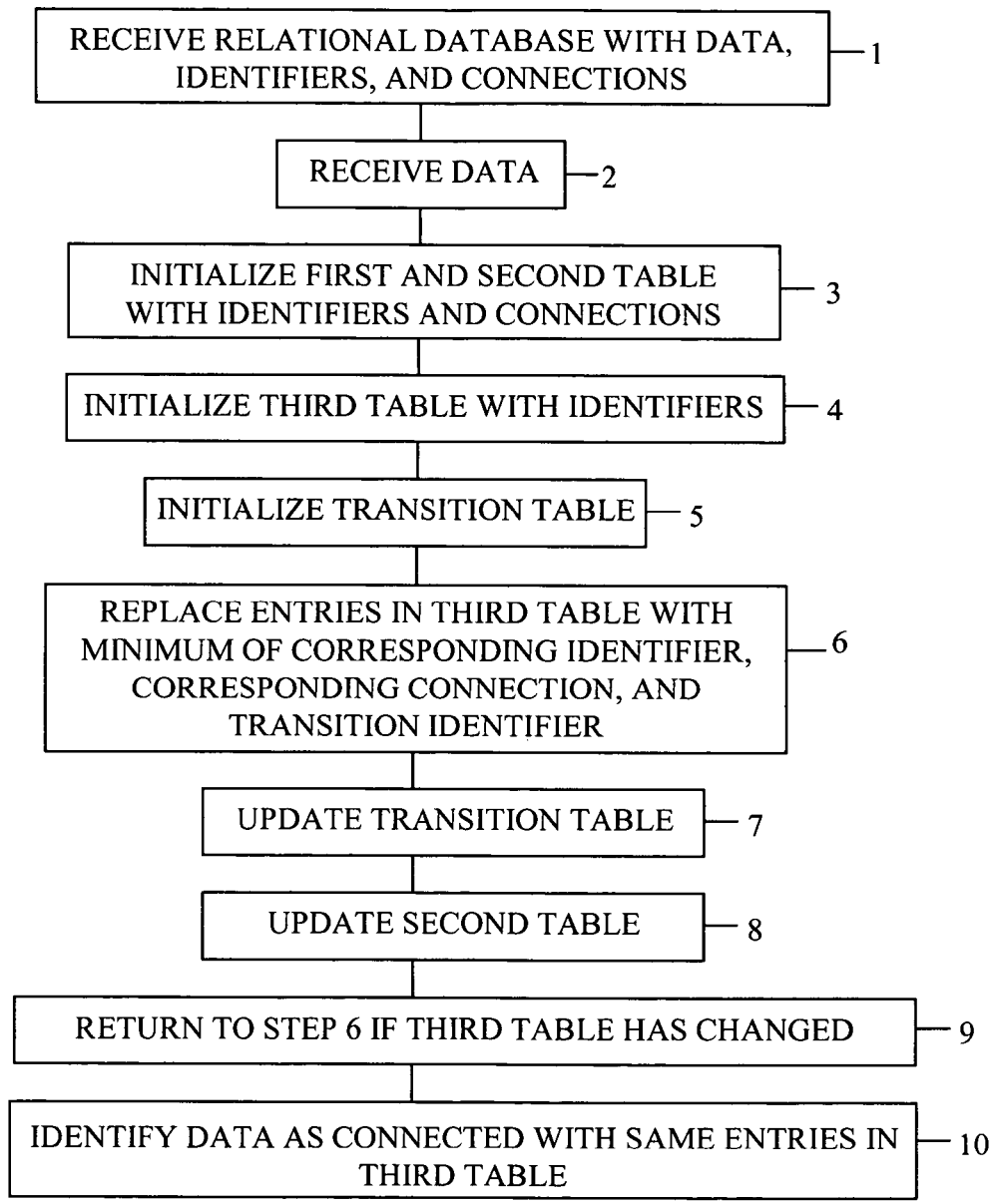
FIG. 1 is a flowchart of the method of the present invention.

FIG. 1 is a flowchart of the method of the present invention.

The first step 1 (i.e., step (a) in claim 1) of the method is receiving a relational database. In the preferred embodiment, the relational database is one that uses the Structured Query language (SQL). The relational database includes a user-definable number of data components. Each data component includes a unique identifier. In the preferred embodiment, the identifier is a number. However, individual letters or multiple letters (e.g., words) may be used as well. Each unique identifier indicates an order of the associated data component as compared to the other data components. In the preferred embodiment, the order is from low to high for numbers or in alphabetical order if letters or words are used. Alternatively, high to low could be used for numbers and reverse alphabetical order could be used for letters and words. Each data component includes information that indicates if it is connected to another data component and, if so, the identifier of each connected data component.

The second step 2 (i.e., step (b) in claim 1) of the method is receiving a user-definable number of data components from the relational database.

The third step 3 (i.e., step (c) in claim 1) of the method is initializing a first table and a second table. The first table and the second table each include an entry for each identifier of a received data component and the identifiers, if any, of connected data components.

The fourth step 4 (i.e., step (d) in claim 1) of the method is initializing a third table. The third table includes an entry for each identifier of a received data component in the same manner as in the first table.

The fifth step 5 (i.e., step (e) in claim 1) of the method is initializing a transition table. The transition table includes entries to indicate transitions, if any, between corresponding identifiers in the second table and the third table.

The sixth step 6 (i.e., step (f) in claim 1) of the method is replacing each entry in the third table with a user-definable relationship of its corresponding identifier in the second table, its corresponding connected data component identifier in the second table, and the identifier to which an equivalent identifier transitioned in the transition table. In the preferred embodiment, the identifiers are numbers, and the user-definable relationship is minimum value. Alternatively, maximum value may be used with numbers. If the identifiers are letters or words then the user-definable relationship is either alphabetic order or reverse alphabetic order.

The seventh step 7 (i.e., step (g) in claim 1) of the method is updating the transition table in accordance with the results of the sixth step 6.

The eighth step 8 (i.e., step (h) in claim 1) of the method is updating the second table in accordance with the results of the sixth step 6.

The ninth step 9 (i.e. step (i) in claim 1) of the method is returning to the sixth step 6 if the third table was changed as a result of the sixth step 6. Otherwise, proceeding to the next step.

The tenth step 10 (i.e., step (j) in claim 1) of the method is identifying the received data components as connected that correspond to entries in the third table that are equal.

FIGS. 2-13 illustrate the operation of the present invention on an example of data received from a relational database.

Figures 2, 3:
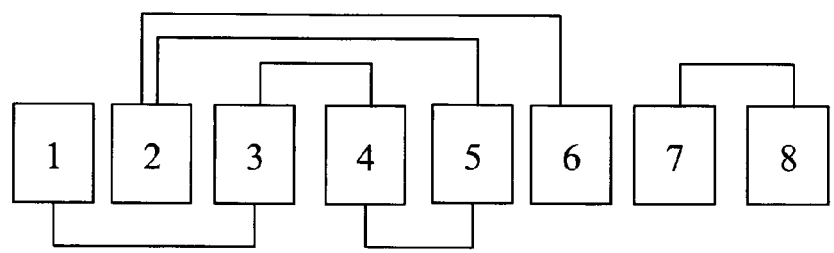
FIG. 2 is an illustration of exemplary data and their connections.
FIG. 3 is an illustration of the initialization of the tables for FIG. 2.

FIG. 2 is an illustration of exemplary data and their connections, where numbers are used as unique identifiers and the user-definable relationship is minimum value. That is, eight data components were received from the relational data base. The data include unique identifiers that indicate the order of the data (i.e., numbers from low to high). Each data component identifies the other data components to which it is connected. That is, data component 1 is connected to data component 3, data component 2 is connected to data components 5 and 6, data component 3 is connected to data components 1 and 4, data component 4 is connected to data components 3 and 5, data component 5 is connected to data components 4 and 5, data component 6 is connected to data component 2, data component 7 is connected to data component 8, and data component 8 is connected to data component 7.

FIG. 3 is an illustration of the initialization of Table 1, Table 2, Table 3, and the Transition Table after the execution of the first step 1 through the fifth step 5 of the method described above. That is, Table 1 is populated with the unique identifiers of the data received in FIG. 2, in order from low to high, along with each data component's connection information. That is, data component 1 is entered along with its connected data component 1, data component 2 is entered along with its connected data components 5 and 6, data component 3 is entered along with its connected data components 1 and 4, data component 4 is entered along with its connected data components 3 and 5, data component 5 is entered along with its connected data components 2 and 4, data component 6 is entered along with its connected data component 2, data component 7 is entered along with its connected data component 8, and data component 8 is entered along with its connected data component 7. Initially, Table 2 includes the same information as in Table 1. Table 3 includes just the identifiers of the data received, without the connection information. The Transition Table is empty since there is no difference between the identifiers between Table 2 and Table 3.

Figures 4, 5:
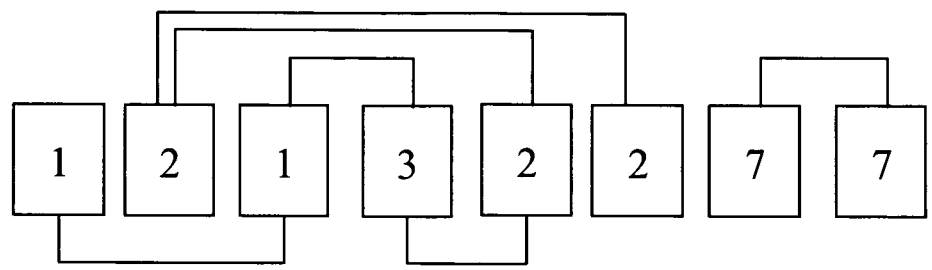
FIG. 4 is an illustration of the data and connections after the first round of the invention.
FIG. 5 is an illustration of tables for FIG. 4 after a first round of the invention.

FIG. 4 is an illustration of the data and connections after the first execution of the sixth step 6 through the eighth step 8 (i.e., the first round) of the method described above. That is, data component identifier 3 is changed to data identifier 1, because the minimum value resulting from the three tests, prior to any changes to identifiers, in the sixth step 6 is component 3's neighbor with the minimum valued identifier of 1. Data component identifier 4 is changed to data identifier 3, because the minimum value resulting from the three tests, prior to any changes to identifiers, in the sixth step 6 is data component 4's neighbor with the minimum valued identifier 3. Data component identifier 5 is changed to data identifier 2, because the minimum value resulting from the three tests, prior to any changes to identifiers, in the sixth step 6 is data component 5's neighbor with the minimum valued identifier 1. Data component identifier 6 is changed to data identifier 2, because the minimum value resulting from the three tests, prior to any changes to identifiers, in the sixth step 6 is data component 6's neighbor with the minimum valued identifier 2. Data component identifier 8 is changed to data identifier 7, because the minimum value resulting from the three tests, prior to any changes to identifiers, in the sixth step 6 is data component 8's neighbor with the minimum valued identifier 7.

FIG. 5 is an illustration of how Table 1, Table 2, Table 3, and the Transition Table change as a result of the first round. That is, Table 1 stays the same, since it merely records the data as received from the relational database. Table 2 is updated to indicate that data component 1 is connected data component 1, data component 2 is connected data components 2 and 2, data component 1 is connected to data components 1 and 2, data component 3 is connected to data components 1 and 2, data component 2 is connected to data components 2 and 3, data component 2 is connected to data component 2, data component 7 is connected to data component 7, and data component 7 is connected to data component 7. Table 3 indicates the identifiers 1, 2, 1, 3, 2, 2, 7, and 7. The Transition Table indicates that data identifier 3 transitioned to 1, data identifier 4 transitioned to 3, data identifier 5 transitioned to 2, data identifier 6 transitioned to 2, and data identifier 8 transitioned to 7.

Since the Third Table changed, the present method returns to the sixth step 6 for another round of the method.

Figures 6, 7:
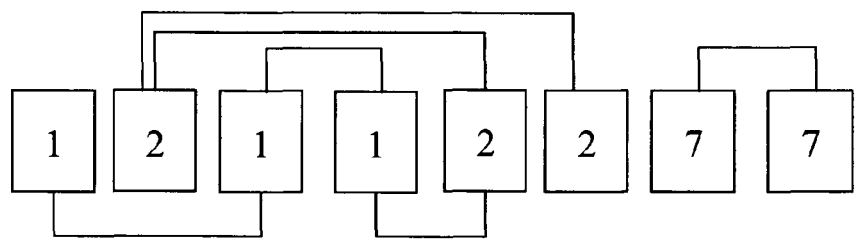
FIG. 6 is an illustration of the data and connections after the second round of the invention.
FIG. 7 is an illustration of tables for FIG. 6 after a second round of the invention.

FIG. 6 is an illustration of the data and connections after the second execution of the sixth step 6 through the eighth step 8 (i.e., the second round) of the method described above. That is, data component identifier 3 is changed to data identifier 1, because the minimum value resulting from the three tests, prior to any changes to identifiers, in the sixth step 6 is component 3's neighbor with the minimum valued identifier of 1.

FIG. 7 is an illustration of how Table 1, Table 2, Table 3, and the Transition Table change as a result of the second round. Again, Table 1 stays the same, since it merely records the data as received from the relational database. Table 2 is updated to indicate that data component 1 is connected data component 1, data component 2 is connected data components 2 and 2, data component 1 is connected to data components 1 and 1, data component 1 is connected to data components 1 and 2, data component 2 is connected to data components 1 and 2, data component 2 is connected to data component 2, data component 7 is connected to data component 7, and data component 7 is connected to data component 7. Table 3 indicates the identifiers 1, 2, 1, 1, 2, 2, 7, and 7. The Transition Table indicates that data identifier 3 transitioned to 1.

Since the Third Table changed, the present method returns to the sixth step 6 for another round of the method.

Figures 8, 9:
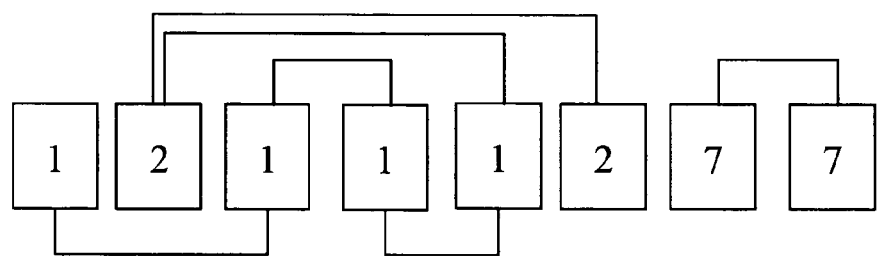
FIG. 8 is an illustration of the data and connections after the third round of the invention.
FIG. 9 is an illustration of tables for FIG. 8 after a third round of the invention.

FIG. 8 is an illustration of the data and connections after the third execution of the sixth step 6 through the eighth step 8 (i.e., the third round) of the method described above. That is, data component identifier 2 is changed to data identifier 1, because the minimum value resulting from the three tests, prior to any changes to identifiers, in the sixth step 6 is component 2's neighbor with the minimum valued identifier of 1.

FIG. 9 is an illustration of how Table 1, Table 2, Table 3, and the Transition Table change as a result of the third round. Again, Table 1 stays the same, since it merely records the data as received from the relational database. Table 2 is updated to indicate that data component 1 is connected to data component 1, data component 2 is connected to data components 1 and 2, data component 1 is connected to data components 1 and 1, data component 1 is connected to data components 1 and 1, data component 1 is connected to data components 1 and 2, data component 2 is connected to data component 2, data component 7 is connected to data component 7, and data component 7 is connected to data component 7. Table 3 indicates the identifiers 1, 2, 1, 1, 1, 2, 7, and 7. The Transition Table indicates that data identifier 2 transitioned to 1.

Since the Third Table changed, the present method returns to the sixth step 6 for another round of the method.

Figures 10, 11:
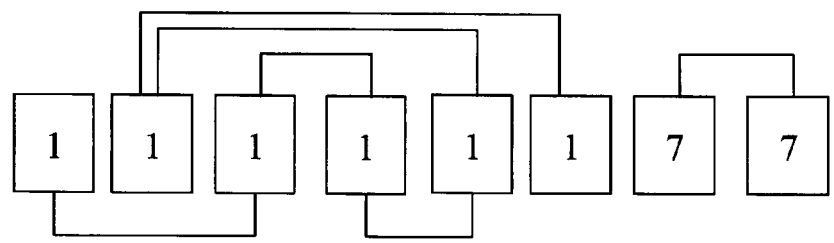
FIG. 10 is an illustration of the data and connections after the fourth round of the invention.
FIG. 11 is an illustration of tables for FIG. 10 after a fourth round of the invention.

FIG. 10 is an illustration of the data and connections after the fourth execution of the sixth step 6 through the eighth step 8 (i.e., the fourth round) of the method described above. That is, a first data component identifier 2 is changed to data identifier 1, because the minimum value resulting from the three tests, prior to any changes to identifiers, in the sixth step 6 is component 2's neighbor with the minimum valued identifier of 1. A second data component identifier 2 is changed to data identifier 1, because the Transition Table as updated below includes an entry that allows any data identifier having a value of 2 to transition to 1.

FIG. 11 is an illustration of how Table 1, Table 2, Table 3, and the Transition Table change as a result of the fourth round. Again, Table 1 stays the same, since it merely records the data as received from the relational database. Table 2 is updated to indicate that data component 1 is connected data component 1, data component 1 is connected data components 1 and 1, data component 1 is connected to data components 1 and 1, data component 1 is connected to data components 1 and 1, data component 1 is connected to data components 1 and 1, data component 1 is connected to data component 1, data component 7 is connected to data component 7, and data component 7 is connected to data component 7. Table 3 indicates the identifiers 1, 1, 1, 1, 1, 1, 7, and 7. The Transition Table indicates that two instances of data identifier 2 each transitioned to 1.

Since the Third Table changed, the present method returns to the sixth step 6 for another round of the method.

Figures 12, 13:
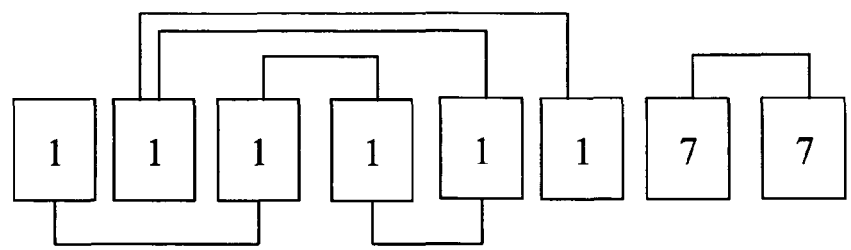
FIG. 12 is an illustration of the data and connections after the fifth round of the invention.
FIG. 13 is an illustration of tables for FIG. 12 after a fifth round of the invention.

FIG. 12 is an illustration of the data and connections after the fifth execution of the sixth step 6 through the eighth step 8 (i.e., the fifth round) of the method described above. That is, none of the data component identifiers change.

FIG. 13 is an illustration of how Table 1, Table 2, Table 3, and the Transition Table change as a result of the fourth round. In the fifth round, none of the tables change. Therefore, the method does not return to the sixth step 6 for another round but proceeds to the tenth, and final, step 10, which is identification of the data components that are connected. Table 3 indicates which data components are connected: the data components that correspond to the entries in Table 3 that share the same value are connected. FIG. 13 indicates that the data components that correspond to the first six entries in Table 3 are connected, because they share the same value 1. The first six entries in Table 3 correspond to data components 1-6. Therefore, data components 1-6 are connected. In addition, Table 3 indicates that entries 7 and 8 are connected, because they share the same value 7. The seventh and eighth entries in Table 3 correspond to data components 7 and 8. Therefore, data components 7 and 8 are connected.

What is claimed is:

1. A method of identifying connected data components in a relational database, comprising the steps of:
   a) receiving on a computing device a relational database, where the relational database includes a user-definable number of data components, where each data component includes a unique identifier, where each unique identifier indicates an order of the associated data component as compared to the other data components, and where each data component includes information that indicates if it is connected to another data component and, if so, the identifier of each connected data component;
   b) receiving on a computing device a user-definable number of data components from the relational database;
   c) initializing on a computing device a first table and a second table, where the first table and the second table each includes an entry for each identifier of a received data component and the identifiers, if any, of connected data components;
   d) initializing on a computing device a third table, where the third table includes an entry for each identifier of a received data component in the same manner as in the first table;
   e) initializing on a computing device a transition table, where the transition table includes entries to indicate transitions, if any, between corresponding identifiers in the second table and the third table;
   f) replacing on a computing device each entry in the third table with a user-definable relationship of its corresponding identifier in the second table, its corresponding connected data component identifier in the second table, and the identifier to which an equivalent identifier transitioned in the transition table;
   g) updating on a computing device the transition table in accordance with the results of step (f);
   h) updating on a computing device the second table in accordance with the results of step (f);
   i) returning to step (f) if the third table was changed as a result of step (f), otherwise, proceeding to step (j); and
   j) identifying on a computing device the received data components as connected that correspond to entries in the third table that are equal.

2. The method of claim 1, wherein the step of receiving on a computing device a relational database is comprised of the step of receiving on a computing device a relational database that uses Structured Query Language.

3. The method of claim 1, wherein the step of receiving on a computing device a relational database, where each data component includes a unique identifier is comprised of the step of receiving on a computing device a relational database, where each data component includes a unique identifier selected from the group of unique identifiers consisting of numbers, individual letters, and multiple letters.

4. The method of claim 1, wherein the step of initializing on a computing device a first table and a second table is comprised of the step of initializing on a computing device a first table and a second table where the initialization method is selected from the group of initialization methods consisting of low-to-high numbers, high-to-low numbers, alphabetic, and reverse alphabetic.

5. The method of claim 1, wherein the step of replacing on a computing device each entry in the third table with a user-definable relationship is comprised of the step of replacing on a computing device each entry in the third table with a user-definable relationship selected from the group of relationships consisting of minimum value, maximum value, alphabetic order, and reverse alphabetic order.

6. The method of claim 2, wherein the step of receiving on a computing device a relational database, where each data component includes a unique identifier is comprised of the step of receiving on a computing device a relational database, where each data component includes a unique identifier selected from the group of unique identifiers consisting of numbers, individual letters, and multiple letters.

7. The method of claim 6, wherein the step of initializing on a computing device a first table and a second table is comprised of the step of initializing on a computing device a first table and a second table where the initialization method is selected from the group of initialization methods consisting of low-to-high numbers, high-to-low numbers, alphabetic, and reverse alphabetic.

8. The method of claim 7, wherein the step of replacing on a computing device each entry in the third table with a user-definable relationship is comprised of the step of replacing on a computing device each entry in the third table with a user-definable relationship selected from the group of relationships consisting of minimum value, maximum value, alphabetic order, and reverse alphabetic order.

* * * * *